United States Patent Office 3,365,338
Patented Jan. 23, 1968

3,365,338
NOVEL FUEL COMPOSITIONS
John N. Hogsett and Virgil E. Matthews, Charleston, W. Va., assignors to Union Carbide Corporation, a corporation of New York
No Drawing. Filed Nov. 1, 1963, Ser. No. 320,860
5 Claims. (Cl. 149—36)

This invention relates to compositions containing dihydrazine compounds which have a plurality of uses, particularly as rocket fuels. In particular, this invention relates to such compositions which contain unsymmetrically substituted alkylene dihydrazines.

The new compositions of this invention are found to possess properties making them eminently suitable as liquid propellants. In the propellant field, a liquid fuel should possess not only high energetic characteristics, e.g., a high specific impulse (positive heat of formation coupled with a low mean molecular weight of combustion products), but must also possess a relatively high density, a liquid state over a broad temperature range (particularly having a freezing point which is sufficiently below 0° C. to allow convenience in storage) and should be easy to handle without creating appreciable hazards.

The compositions of this invention possess each of the above characteristics thereby readily lending themselves for use as propellants. A particularly desirable characteristic of the compounds of this invention is their relatively low melting or freezing point thereby allowing their use in propellant systems which are exposed to varying weather conditions. For example, the compounds of this invention typically possess a freezing point at least below −15° C. The freezing point of the compounds of this invention are appreciably superior to the freezing points of some of the most desirable propellant fuels presently employed.

In addition, the new compounds of this invention can be employed as activators in conventional emulsion polymerizations of olefinically unsaturated compounds or as anti-oxidants in many areas, e.g., for synthetic and natural rubbers. In addition, the new unsymmetrically substituted alkylene dihydrazines of this invention can be employed as chemical intermediates for the manufacture of a plurality of compounds. Illustrative reactions in which these new compounds may be employed will be described below.

The compositions of this invention are characterized by the following formula:

I 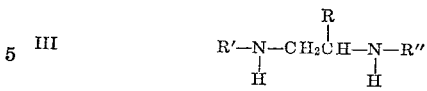

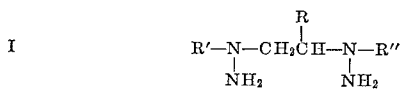

wherein R may be hydrogen or an alkyl group from 1 to about 18 carbon atoms, preferably an alkyl group of from 1 to about 4 carbon atoms, and R′ and R″ may each be an alkyl group having from 1 to about 18 carbon atoms, preferably an alkyl group of from 1 to about 4 carbon atoms. In the most desirable embodiment of this invention, R is hydrogen and R′ and R″ are methyl.

These compounds may be made by reduction of nitroso substituted intermediate precursors. Thus, the novel dihydrazine compounds of this invention are produced by the reduction of dinitroso substituted diamines characterized by the following formula:

II 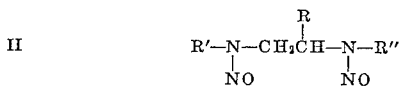

wherein R, R′ and R″ are as described above. These nitroso compounds are typically prepared by the reaction of nitrous acid with diamines characterized by the following formula:

III $$\begin{array}{c} R \\ | \\ R'-N-CH_2CH-N-R'' \\ | \hspace{2em} | \\ H \hspace{2em} H \end{array}$$

The dinitroso substituted alkylene diamine products characterized by Formula II may be reduced at operative conditions of hydrogenation to form the novel dihydrazine compounds of this invention.

Reductions of the dinitroso compound may be effected by any of the variety of techniques known in the art for the reduction of —NO to NH₂. Illustrative systems for reduction of the nitroso radicals include reaction with hydrogen in the presence of a catalyst, such as Raney-Nickel, palladium on barium or calcium carbonates, platinum, palladium on carbon, and the like. The hydrogenation of the nitroso substituted diamines is usually effected utilizing the above hydrogenation system as super-atmosphere pressures, though typically not at a pressure in excess of 1,000 pounds per square inch gauge (p.s.i.g.).

In addition, the nitroso compounds may be reduced to the dihydrazine compounds by chemical reductions of the —NO group. This type of reduction may be effected by intermixing the dinitroso substituted diamine with, for example, zinc metal and glacial acetic acid. Other chemical reduction methods include reaction with e.g., lithium aluminum hydride and similar metallic hydrides.

It is evident that other reducing systems not particularly specified above may be employed. However, in effecting the reduction of the aforedescribed dinitroso substituted diamines, it is important to avoid over-reduction of the compound. For example, too high a temperature could result in the splitting off of —NH₂ groups in excess of that which is desired and as a result it is preferable to operate the process at the minimum operative temperature. As a result, the process should be carried out at a temperature typically above about 35° C. and not in excess of about 85° C. The reaction may be carried out in an inert solvent medium in which the dinitroso compound is soluble but does not react with the solvent. A particularly desirable solvent is water, preferably distilled and/or deionized water. Other solvents which may be employed include alkanols such as methanol, ethanol, propanols, and butanols. Lithium aluminum hydride reductions may be performed in dialkyl ethers.

The di-substituted alkylene diamines from which the compositions of this invention are produced include, for example, N,N′-dimethylethylenediamine,
N-methyl-N′-ethylethylenediamine,
N,N′-diethylethylenediamine,
N,N′-dimethyl-1,2-diaminopropane,
N,N′-dimethyl-1,2-diaminobutane,
N,N′-dimethyl-1,2-diaminohexane,
N,N′-di-n-propyl-1,2-diaminopropane,
N,N′-diisobutyl-ethylenediamine,
N-2-ethylhexyl-N′-methylethylenediamine,
N-nonyl-N′-tridecylethylenediamine,
N-dodecyl-N′-stearylethylenediamine, and the like.

The resultant compositions of this invention, such as obtained from the listed precursors as defined by Formulae II and III by the aforedescribed hydrogenation process, include, for example, N,N′-dimethyl-N,N′-diaminoethylenediamine,
N-methyl-N′-ethyl-N,N′-diaminoethylenediamine,
N,N′-diethyl-N,N′-diaminoethylenediamine,
N,N′-dimethyl-N,N′-diamino-1,2-diaminopropane,
N,N′-dimethyl-N,N′-diamino-1,2-diaminobutane, N,N'-dimethyl-N,N'-diamino-1,2-diaminohexane,
N,N'-dimethyl-N,N'-diamino-1,2-diaminododecane,
N,N'-di-n-propyl-N,N'-diamino-1,2-diaminopropane,
N,N'-diisobutyl-N,N'-diaminoethylenediamine,
N-2-ethylhexyl-N'-methyl-N,N'-diaminoethylenediamine,
N-nonyl-N'-tridecyl-N,N'-diaminoethylenediamine,
N-dodecyl-N'-stearyl-N,N'-diaminoethylenediamine, and the like compounds. It is readily apparent that many other specific compounds encompassed by Formula I may be also prepared in the manner described herein. Particularly preferred are those compounds described by Formula I herein wherein R is hydrogen and R' and R" are alkyl groups of 1 to 18 carbon atoms, particularly of from 1 to about 4 carbon atoms. The most desirable compound in view of its considerably high energetic qualities, satisfactorily low freezing point and desirable handling qualities is the compound: N,N'-dimethyl-N,N'-diaminoethylenediamine. This compound is indicated to posses properties making it the most desirable of the class defined by Formula I.

Compounds of this invention as indicated previously may be utilized as chemical intermediates in producing other materials. For example, one mole of N,N'-dimethyl-N,N'-diaminoethylenediamine may be reacted with, for example, 2 moles of benzaldehyde to give the corresponding dihydrazone, i.e.,

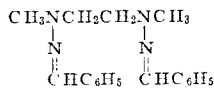

Other useful chemical reagents can be specifically produced utilizing the compounds encompassed in Formula I as a reactant or as a co-reactant with other chemicals. In addition, the novel dihydrazines may be employed as co-reactants with dicarboxylic acids, e.g., adipic acid, to form polyamides of the nylon class which possess internal tertiary amine sites which provide acid dye receptivity.

As indicated previously, the compounds of Formula I represent a desirable propellant fuel and may be so employed alone or in admixture with other known fuels such as hydrazine, unsymmetrical dimethylhydrazine, symmetrical dimethylhydrazine, monomethylhydrazine, and other well known liquid fuels usable as propellants, particularly in rockets. It is desirable to employ an amount of the novel compounds of this invention in admixture with other fuels sufficient to take advantage of any potential synergistic effect the mixture is capable of producing, e.g., such as forming an eutectic melting mixture.

As indicated previously, the dinitroso compounds characterized by Formula II are formed by the reaction of the compounds encompassed by Formula III with nitrous acid. The resulting dinitroso compound is isolatable by extraction with alcohols such as alkanols, e.g., methanol, to obtain a suitably pure product. The dinitroso compounds characterized by Formula II may be thereafter hydrogenated as indicated above to produce the novel compounds characterized by Formula I. A purified product may be obtained by reaction of a compound embodied by Formula I with a halogen acid particularly hydrochloric acid to form the corresponding dihydrochloride of the product of Formula I. The dihydrochloride may be thereafter treated with an alkali metal hydroxide, to convert the salt to the product characterized by Formula I.

The following examples which further illustrate the invention are not to be considered to limit its scope.

*Example I*

Some 72.1 grams of technical grade N,N'-dimethylethylenediamine were dissolved in 50 milliliters of water and 255 milliliters of concentrated hydrochloric acid were added in portions while cooling. The mixture was stirred for 3.5 hours, then 93.2 grams of sodium nitrite dissolved in 250 milliliters of water were added causing the temperature to rise to 80° C. A test at the end of this period with starch-iodide paper showed that no excess nitrous acid was present. Additional solid sodium nitrite was added until the solution turned green and a yellow solid separated out. The solution was cooled in ice for two hours and filtered to recover 51.7 grams of yellow solid having a melting point of 54–56° C. (dried in vacuo). Concentration of the filtrate after addition of sufficient sodium nitrite to give an excess of nitrous acid led to the recovery of an additional 23.8 grams of a mixture of white and yellow needles. All of the solids were combined and extracted with methanol to separate organic from inorganic materials.

By repeated concentrations of the filtered methanolic extracts, followed by addition of petroleum ether, filtration to remove solids, and finally, evaporation of the methanolic extracts to dryness, 73 grams of N,N'-dinitroso - N,N' - dimethylethylenediamine were recovered (dried in vacuo).

*Example II*

Some 49.2 grams of N,N'-dinitroso-N,N'-dimethylethylenediamine were dissolved in 300 milliliters of water with vigorous stirring. To the resulting dark yellow solution were added 184 grams of zinc dust (90 weight percent pure, containing 165.4 grams of zinc), followed by dropwise addition of 190 milliliters of glacial acetic acid over a three-hour period. The reaction temperature was held below 30° C. throughout this addition.

After the addition was completed, the mixture was stirred at room temperature for one hour, then warmed to 60° C. for 1.5 hours. Unreacted zinc was removed by filtration, the filtrate was cooled to 5° C., and 295 grams of sodium hydroxide pellets were added with stirring until the pH was 10. In an attempt to dissolve precipitated zinc salts, 954 grams of an aqueous solution containing 40 weight percent potassium hydroxide were added. This give some dissolution of the precipitate.

The reaction mixture was distilled until the aqueous distillate was only weakly alkaline and gave a weak test for hydrazino groups (Tollen's reagent). Some 1,322 grams of distillate were collected.

The aqueous distillate from the alkaline reaction mixture was acidified to a pH of 2 with concentrated hydrochloric acid, then the water was evaporated under reduced pressure to leave a white solid residue. This solid was dried by adding 100 milliliters of ethanol and stripping to dryness at reduced pressure. This operation was carried out three times, then the solid was further dried overnight in a vacuum desiccator to yield 55.5 grams of a mixture of white and yellow solids.

The solid residue was extracted with boiling ethanol to yield 45.3 grams of white solid having a melting point of 160–163° C. Extraction of this white solid with two 100-milliliter portions of hot ethanol gave 41.5 grams of the N,N'-diamino-N,N'-dimethylethylenediamine dihydrochloride having a melting point of 162–163° C.

An analytical sample having a melting point of 163–166° C. was obtained by three recrystallizations from an ethanol-water mixture.

*Analysis.*—Found: C, 24.79; H, 8.76; Cl, 38.07. Calc'd for: $C_4H_{16}N_4Cl_2$: C, 25.14; H, 8.44; Cl, 37.10.

*Example III*

To 37.1 grams of N,N'-diamino-N,N'-dimethylethylenediamine dihydrochloride under a nitrogen atmosphere in a closed flask were added 50 grams of pulverized solid sodium hydroxide. The mixture was stirred while a vacuum of 3 millimeters of Hg pressure and slow heat was applied to the mixture. At approximately 40° C., a vigorous exothermic reaction occurred, the temperature rose to 65° C., and a colorless liquid distilled over at from 40–63° C./4 millimeters Hg. After two hours, no more liquid distillate was seen. Some 22.38 grams of colorless liquid distillate were collected. An infrared scan of the distillate indicated that it contained water (broad band in 3 micron region). The distillate was dried over barium oxide overnight, then distilled to give 18.3 grams of a colorless, basic liquid having a boiling point of 70.5–73° C./5 millimeters Hg, $n_D^{20}$ 1.4789.

This liquid was again dried over barium oxide and fractionated to yield 10.84 grams of colorless liquid, $n_D^{20}$ 1.4789. The infrared spectrum had the characteristic doublet (shown by unsymmetrically substituted hydrazines) at 3130 and 3290 cm.$^{-1}$; Melting point −17.5° C.; density (20° C.) 0.952.

*Analysis.*—Found: C, 39.31; H, 11.81; N, 47.08; N.E., 59.56. Calc'd for $C_4H_{14}N_4$: C, 40.65; H, 11.94; N, 47.41; N.E., 59.10.

Heat of combustion (found): 13,538 B.t.u./lb. (888.91 Kcal./mole).

Calc'd $\Delta H_f° = +34.48$ Kcal./mole.

The compound was 99.2 weight percent pure N,N'-diamino-N,N'-dimethylethylenediamine.

Example IV

Some 25 grams of N,N'-dimethyl-1,2-propanediamine were dissolved in 150 milliliters of water and some 25.2 grams of aqueous 95.5 weight percent sulfuric acid were fed dropwise with stirring. The aqueous acidic solution was cooled to 19° C., and 34.5 grams of 98 weight percent sodium nitrite were added in portions to the stirred solution over a 40-minute period. The solution was stirred at room temperature for one hour and ten minutes, then heated to 77° C. and maintained between 77 and 87° C. for two and one-half hours. When the stirrer was stopped, two layers were observed; a pale amber lower layer and a wine-colored clear oil. Upon chilling to 10° C., the top layer solidified. It was removed by filtration, washed with water, and dried in vacuo to yield 27.3 grams of cream-colored solid. Treatment of the filtrate (which had a pH of 8) with additional acid and evaporation yielded two additional crops, one crop (after purification by extraction of the original precipitate with hot ethanol) was 2.92 grams of a yellow oil and the other crop was 3.62 grams of yellow needles. The 2.92 grams of yellow oil solidified when seeded with a few crystals of the cream-colored solid.

A sample of the yellow needles was recrystallized from ethanol and petroleum ether to provide an analytical sample having a melting point of 47–49° C.

*Analysis.*—Found: C, 37.91; H, 8.23; N, 34.52. Calc'd for N,N'-dinitroso-N,N'-dimethyl-1,2-propanediamine ($C_5H_{12}N_4O_2$): C, 37.53; H, 7.50; N, 34.77.

Example V

Seventy and twenty-seven hundreds grams (70.27 grams) of N,N'-dinitroso-N,N'-dimethyl-1,2-propanediamine were dissolved in 470 milliliters of water by stirring and warming to 34° C. To the resulting solution were added 214 grams of zinc. Then 240 milliliters of glacial acetic acid were fed dropwise over one hour and 49 minutes while keeping the temperature of the reaction mixture below 30° C. The resulting gray slurry was stirred at ambient temperature for two hours, then warmed to 61° C. on a steam bath over a 17-minute period, and maintained at between 59–65° C. for one hour. The mixture was allowed to stand overnight, the unreacted zinc was removed by filtration and washed with five small portions of water. The filtrate was cooled to 5° C., and aqueous 40 percent by weight sodium hydroxide solution was added dropwise with stirring until the initially formed precipitate redissolved. The resulting solution was steam distilled until the distillate no longer gave a positive Tollen's test. Approximately 7 liters of distillate were collected. The alkaline distillate was neutralized to a pH of 2 with concentrated HCl, and concentrated in vacuo to a viscous, amber-colored semi-solid. Some 50 milliliters of water were added and then removed in vacuo, followed by addition of 100 milliliters of ethanol which were distilled off in vacuo.

The treatment with ethanol was repeated twice. The resulting glass-like, yellow solid was pulverized, then dried in a vacuum desiccator over concentrated sulfuric acid for two days to yield 73.8 grams of solid hydrochloride.

The solid was treated with 145 grams of powdered solid sodium hydroxide. Upon heating and stirring the hydrochloride-NaOH mixture in vacuo, an exothermic reaction occurred at 72° C./110 millimeters Hg. The resulting mix was subjected to reduced pressure distillation to a final flask temperature of 168° C./7 millimeters Hg, under which conditions no more distillate was observed. Some 56.11 grams of colorless liquid, $n_D^{20}$ 1.4501, were collected in the receiver, and 3.63 grams, $n_D^{20}$ 1.3746, were collected in a −80° C. trap. Treatment of the trap fraction with solid potassium hydroxide gave an aqueous lower layer and a yellow organic layer which was added to the main fraction. The combined organic layers were dried over several days over barium oxide, then distilled to yield 9 fractions, total weight 41.48 grams. Fraction 9, (15.92 grams $n_D^{20}$ 1.4775, boiling point 75.5–77° C./4 millimeters of Hg) was a colorless liquid which gave a strongly positive Tollen's test (hydrazine groups).

*Analysis.*—Equivalent weight calculated for N,N'-diamino-N,N'-dimethyl-1,2-propanediamine ($C_5H_{16}N_4$): 66.11. Found (titration with perchloric acid in acetic acid): 67.3.

This corresponds to a purity of 98 percent N,N'-diamino-N,N'-dimethyl-1,2-propanediamine. The infrared spectrum was very similar to that of N,N'-diamino-N,N'-dimethylethylenediamine and unsymmetrical dimethylhydrazine, showing the typical doublet at 3145 and 3300 cm.$^{-1}$ with a weak band at 3210 cm.$^{-1}$, as well as the band characteristic of —NH$_2$ groups (N—H bending) at 1710 cm.$^{-1}$.

Although the above describes this invention with reference to various specific embodiments, they are not to be construed as limitations of this invention unless so specified in the appended claims.

What is claimed is:

1. A fuel composition comprising a dihydrazine compound of the formula

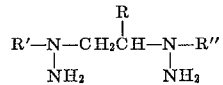

wherein R is a radical from the group consisting of hydrogen and alkyl of from 1 to about 18 carbon atoms, R' is an alkyl radical of from 1 to about 18 carbon atoms, and R" is an alkyl radical of from 1 to about 18 carbon atoms; and a compound of the group consisting of hydrazine, unsymmetrical dimethylhydrazine, symmetrical dimethylhydrazine and monomethylhydrazine.

2. The composition of claim 1 wherein R' and R" of the dihydrazine compound are alkyl radicals of from 1 to 4 carbon atoms.

3. The composition of claim 1 wherein R of the dihydrazine compound is hydrogen, R' and R" are alkyl radicals of from 1 to 4 carbon atoms.

4. The composition of claim 1 wherein the dihydrazine compound is N,N'-dimethyl-N,N'-diaminoethylenediamine.

5. The composition of claim 1 wherein the dihydrazine compound is N,N'-dimethyl-N,N'-diamino-1,2-propanediamine.

References Cited

UNITED STATES PATENTS

| | | | |
|---|---|---|---|
| 2,445,518 | 7/1948 | Dreyfus | 260—583 |
| 2,822,354 | 2/1958 | Uraneck et al. | |
| 3,129,215 | 4/1964 | Horvitz | 260—583 X |
| 3,157,616 | 11/1964 | Stewart | 260—583 X |

L. DEWAYNE RUTLEDGE, *Primary Examiner.*

CHARLES B. PARKER, *Examiner.*

R. L. RAYMOND, M. J. SCOLNICK,
*Assistant Examiners.*